Figure 4:
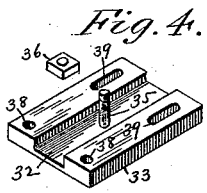

(No Model.)  2 Sheets—Sheet 1

A. M. FITCH.
WALKING AND RIDING PLOW.

No. 468,966. Patented Feb. 16, 1892.

Witnesses:
T. K. Stuart,
Parker H. Sweet Jr.

Inventor:
Asa M. Fitch
By Marble + Mason,
Attorneys.

(No Model.)  2 Sheets—Sheet 2.

A. M. FITCH.
WALKING AND RIDING PLOW.

No. 468,966.  Patented Feb. 16, 1892.

Witnesses:
T. R. Stuart
Parker H. Sweet Jr.

Inventor:
Asa M. Fitch.
By Marble & Mason,
Attorneys.

UNITED STATES PATENT OFFICE.

ASA M. FITCH, OF SEYMOUR, INDIANA.

WALKING AND RIDING PLOW.

SPECIFICATION forming part of Letters Patent No. 468,966, dated February 16, 1892.

Application filed December 5, 1889. Serial No. 332,647. (No model.)

*To all whom it may concern:*

Be it known that I, ASA M. FITCH, a citizen of the United States, residing at Seymour, in the county of Jackson and State of Indiana, have invented certain new and useful Improvements in Combined Walking and Riding Plows; and I do hereby declare the following to be a full, clear, and exact description of the invention, such as will enable others skilled in the art to which it appertains to make and use the same.

My invention relates, generally, to wheel-plows, and particularly to combined walking and riding plows which are convertible into either riding or walking plows and to plows in which vertically-adjustable pivoted trucks are employed at the forward portions of plow-beams for permitting the truck-wheels to pass over the usual obstacles encountered in plowing, for raising the plows proper out of the ground and carrying them from one field or place to another, and for regulating the depth of cut of said plows, as desired, all of these results being effected without the slightest strain upon the frame-work or several parts of the plows, and in which, consequently, plowing is effected with equal ease and accuracy in rough and smooth ground and on hillsides, in which furrow-wheels are employed in rear of the plows proper for running upon the bottoms of the furrows or surface of the ground and steadying and supporting said plows while being turned and moved from one field or place to another and for forming fulcrums for raising said plows from the furrows or surface of the ground, and in which adjustable furrow-wheel standards are employed for regulating the depth of penetration of the plows into the ground; and my present invention is especially designed as an improvement upon those disclosed in Letters Patent granted to me May 12, 1885, No. 317,754, and in application filed October 31, 1889, Serial No. 328,785, although it is equally applicable to any hand-plow, right or left, whereon its employment may be desired.

The objects of my present invention are, first, to provide improvements in the construction of the truck for the forward portion of the plow-beam and in the devices for effecting the vertical adjustment of said truck and its connection to said beam, whereby the depth of plowing may be quickly and accurately varied and the plow proper elevated from the ground for movement from one field or place to another; second, to provide novel and improved means for the attachment of the truck-wheels and furrow-wheel to plow-beams of varying sizes; third, to provide novel and improved means for raising and lowering the plow proper and for transferring the furrow-wheel and the lower arm of its standard to a point on a line to the right or left of the upper arm of the standard, as desired; fourth, to provide a novel attachment for effecting the ready conversion of the plow either into a walking or riding plow and for transposition to either side of the plow-beam, so as to render said attachment capable of use in connection with either right or left hand plows, and, fifth, to provide novel means of connection between the land-wheel and axle of said attachment, whereby said wheel can be raised from or lowered upon the ground, as desired; and my invention consists in the peculiarities of construction and arrangement or combination of parts hereinafter disclosed in the description, drawings, and claims.

Figure 5:
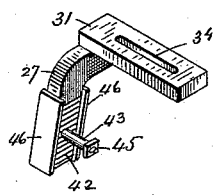
Figure 6:
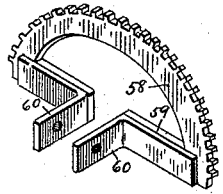

In the accompanying drawings, forming part of this specification, and in which the same reference-numerals indicate the same parts, Figure 1 is a perspective view of a left-hand plow with my improvements attached, the land-wheel being detached from its short stud or journal; Fig. 2, a perspective view of the complete attachment removed from the plow, looking thereat at a slight angle to its rear portion, or toward the inner end of the axle, upon which the land-wheel is indirectly journaled; Fig. 3, a detail partly-sectional perspective view showing the construction of the axle upon which the land-wheel is indirectly journaled; Fig. 4, a detail perspective view of the under side of the upper fish-plate, showing the holes, slots, and recess therein; Fig. 5, a detail perspective view of the lower fish-plate and the upper arm of the two-part standard of the furrow-wheel secured thereto, showing also the screw-bolt fixed in said arm and the flanges on the edges of the latter; Fig. 6, a detail view of the inner side of the horizontal segment-rack, which is fixed to the outer end of the axle that indirectly supports the land-wheel; and Fig. 7, a detail perspective view, looking upwardly at an angle, of the two clips, the upper fish-plate, the double brace or bracket attached to two branches of said clips, the lower arm of said two-part standard formed with the slot along its upper portion, and the furrow-wheel journaled at the lower end of said lower arm.

In the drawings, the numeral 1 designates the plow-beam, 2 the plow proper, 3 the handles, and 4 the plow-standard, to which and said handles the plow is secured in any suitable manner, all being of any ordinary or preferred construction.

The truck 5, consisting of the two caster or fixed wheels 6, as respectively shown in Figs. 1 and 2, and the single yoke 7, is applied to the forward portion of the plow-beam 1 and suspended therefrom by the curved ratchet-bar 8, which is pivoted at its lower end to the center of said yoke upon the screw-bolt 9, having the nut 9', and passed up through a correspondingly-shaped slot 10, formed in the bracket 11, which is removably attached to either side of said plow-beam by the clips 12, which are passed over and under said beam and through holes formed in said bracket and provided with the nuts 13, which are adjustable back and forth along the ends of said clips for holding them firmly in place and permitting of their attachment to plow-beams of varying sizes. The curved ratchet-bar 8 is formed with cogs or teeth on its rear or concaved edge, between which engages the pawl 14, which extends alongside of the plow-beam, passes through the opening 15, leading from the inner edge of the bracket 11 to the curved slot 10, and through a hole formed in the flange 16 of the rearwardly-extending arm 17, which is attached to or forms a part of said bracket. A spiral spring 18 is placed around a portion of said pawl, rests at its rear end against the flange 16, and is fastened at its front end to said pawl at a point just in rear of said bracket, the result being that said pawl is normally forced forward between the cogs or teeth of the curved ratchet-bar 8 and holds the same in any desired position. At its rear end this pawl is pivotally connected to a front lug 19 on the lower edge of a disk 20, which is pivoted upon the screw-bolt 21, that passes through the plow-beam and is provided with the nut 22 on its opposite end. To a rear lug 23 on the same disk is pivotally connected the lower end of the forwardly and downwardly inclined rod 24, the upper end of which is pivotally connected to the finger-lever 25, which is pivoted to the hand-lever 26, which is also forwardly and downwardly inclined, pivoted upon the screw-bolt 21, and mounted at its lower end upon the screw-bolt 9, which also pivotally connects the yoke 7 and the curved ratchet-bar 8. These parts of my attachment are capable of being removed from the positions shown and placed upon the opposite side of the plow-beam when desired for use in connection with a right-hand plow, of being adjusted for raising and lowering the two-wheeled truck, which is centrally pivoted and preferably provided with the swivel or caster wheels 6, as shown in Fig. 1, for permitting said wheels to easily turn circularly, or around corners without any cramping of said wheels, and to easily pass over or around the usual obstacles encountered in plowing, of being raised and lowered for regulating the depth of the furrows plowed, and for elevating the plow proper from the ground for moving the same from one field or place to another, and also of being attached to plow-beams of varying sizes. Adjacent to the peripheries of these truck-wheels are secured scrapers 6' for the removal of adhering dirt from said wheels, as shown in Figs. 1 and 2.

Figure 7:
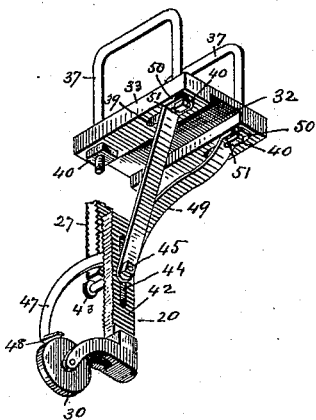

At a point just in rear of the plow-standard 4 is secured the upper arm 27 of the two-part jointed standard 28, to the lower end of the lower arm 29 of which is journaled the furrow-wheel 30, as shown in Figs. 1, 2, and 7. The upper portion of the arm 27 is curved slightly forward and attached at its end to the end of the lower fish-plate 31, which is fitted in a correspondingly-shaped recess 32, formed in the under face of the upper fish-plate 33, as shown in detail in Figs. 4 and 5. The ends of these fish-plates and the upper arm of the standard are arranged at right angles to each other.

The lower fish-plate 31 is formed with a central elongated opening or slot 34, which extends lengthwise thereof, or transversely of the plow-beam, and is adapted to receive the screw-bolt 35 of the upper fish-plate 33, which projects downwardly therethrough and is provided with a nut 36 for rigidly holding said fish-plates together in whatever position they may be adjusted. The upper fish-plate rests against the under side of the plow-beam 1 and is firmly secured thereto by the clips 37, which pass over said beam and down through the holes 38 and slots 39, which are formed in said fish-plate near its inner and outer edges. These clips are screw-threaded along their lower portions for receiving the nuts 40, by which the upper fish-plate may be tightened against, loosened for adjustment upon, or removed from the plow-beam. These adjustable fish-plates as constructed and the adjacent parts not only afford a firm connection between the plow-beam and the furrow-wheel and its two-part jointed standard, but render it possible by means of their adjustability to apply them to plow-beams of varying sizes.

At the lower and upper ends, respectively, of the two arms 27 and 29 of the furrow-wheel standard 28 is provided an adjustable double connection or joint 41, which consists of the transversely-arranged series of notches or serrations 42, which are formed upon both sides of the adjacent portions of said arms, which engage each other and which are clamped firmly together by the screw-bolt 43, passing through the vertical slot 44, formed in the lower arm 29, and by the nut 45. The faces of these serrations snugly intermesh and permit of no play or movement of the arms whatever; also, by loosening said nut the serrations on the two arms can be disconnected, when said lower arm can be raised or lowered, as desired, and its serrations again engaged with and secured to those on the upper arm, which will have the effect of adjusting the position of the furrow-wheel 30 and of correspondingly raising or lowering the plow for forming shallow or deep furrows; also, by removing said nut and screw-bolt the lower arm and its furrow-wheel can be transferred to the opposite side of the correspondingly-serrated upper arm, and thereby effect the transposition of the furrow-wheel to the right or left of a line passing through the plow-standard or the point of the plow proper, as may be desired or necessary in forming the furrows in plowing or in transferring the attachment from a left to a right hand plow, or vice versa.

The lower portion of the upper arm 27 of the furrow-wheel standard is provided with flanges 46, which project over its sides at its front and rear edges and receive between them the snugly-fitting upper portion of the lower arm 29 of said furrow-wheel standard, whether said lower arm is arranged on the right or left side of the upper arm 27 of said standard. These flanges guard against the rearward and forward movement of the lower arm of said standard, and, in connection with the screw-bolt 43 and its nut 45, firmly hold it and its furrow-wheel in whatever position they may be placed or adjusted. Intermediate of the serrated portions of these upper and lower arms, preferably above the screw-bolt 43, is clamped the upper end of an adjustable and removable scraper 47, which is provided with a lateral extension 48 at its lower end for removing adhering dirt from the periphery of said furrow-wheel. As such scrapers are ordinarily subjected to constant friction and wear, it is found to be an advantage to thus arrange and connect this scraper, so that it can be slightly raised or adjusted to avoid much friction or removed for repair or renewal.

For the purpose of providing additional support for the arms of the furrow-wheel standard a double brace or bracket 49, having an approximately V shape, as shown in Fig. 7, is secured at its convergent or lower end by the screw-bolt 43 and nut 45, while its upper or divergent ends, which are bent to form the horizontal flanges 50 and formed with the slots 51, are secured by the nuts 40 to the inner lower ends of the clips 37, which pass down through the slots 39 in the upper fish-plate 33. This brace or bracket, together with the upper and lower fish-plates, is also rendered adjustable for use in connection with left and right hand plows and plow-beams of varying sizes.

The above-described two-wheeled truck, the devices for adjusting and operating the same, and the two-part furrow-wheel standard and its securing and adjusting devices are not only capable of independent or joint use in connection with left or right hand plows, but they are also employed in connection with and form parts of my novel and improved attachment for the conversion of walking into riding plows, and vice versa, the several parts of which are constructed, combined, and operated as follows: The frame-work of this attachment, as shown in Figs. 1 and 2, consists of the brace-bar 52, which extends obliquely toward the forward end of the plow-beam, and the two-part or branched axle 53, which is connected at its outer solid end 54 to said brace-bar and at its inner or branched portion to said plow-beam just in rear of the plow-standard 4. The front end of the brace-bar 52 is connected to the upper branch of the rear clip 12, which passes through the removable bracket 11, and is held thereon by the nut 13, the rear end of said brace-bar being provided with the flange 55, through which passes the screw-bolt 56, which also passes through the solid end 54 of the axle 53. The inner or branched portions of this axle are bent or formed into the sockets 57, through which pass the inner vertical branches of the clips 37 for holding the inner end of said axle firmly against the side of the plow-beam. Upon the outer or solid end of the branched axle 53 is secured the horizontal segment-rack 58, which is provided near the center of its base-bar 59 with inwardly-projecting lugs 60, which fit into correspondingly-shaped shallow recesses 61, formed in the front and rear sides of the solid part of said axle, and through which are passed the screw-bolt 56, having the nut 62 on its rear portion for firmly holding said segment-rack in place. The outer end of the axle 53 is provided with a screw-stud 63, having a nut 64 for holding in place the hand-lever 65, which has a lower portion that is triangular in shape and which is provided with a finger-lever 66 and also with a spring-actuated rod or pawl 67 for engaging the segment-rack 58. To the rear angle of the triangularly-shaped portion of said hand-lever is fixed a short stud or journal 68, which is screw-threaded along its outer portion and provided with a nut 69 and upon which is journaled the large land-wheel 70, which is preferably provided with a wide thin periphery and oppositely-dished spokes for securing lightness and strength. This hand-lever, being provided with the triangularly-shaped lower portion, forms a double brace or support for said land-wheel, and at the same time throws the bearing and weight equally upon the segment-rack 58 and the branched axle 53, whereby proper distribution of the weight and firm bracing of said wheel are secured; also, by raising and lowering the hand-lever 65 and engaging the spring-pawl 67 with the segment-rack 53 at different points of its arc the land-wheel, being journaled upon said lever, will also be raised and lowered at the same time, thus adapting my combined walking and riding plow for use in hillside plowing, as the raising of said land-wheel at the side of the plow will perfectly balance the latter, prevent the same from being tipped over on hillsides, relieve the draft, and afford said plow an easy and natural passage, which would not be possible were said land-wheel journaled directly upon the outer end of the branched axle 53.

The seat 71 for the driver is made in one piece with the downwardly-inclined spring-bar 72 and the foot-rest 73, the lower horizontal portion of this spring-bar being fitted in the groove 74, formed in the solid end 54 of the branched axle 53, and firmly but removably held in said groove by the screw-bolt 75, which passes down through said axle and is provided beneath the same with the nut 76. By removing this nut and bolt the one-piece seat, spring-bar, and foot-rest can also be removed, reversed, and again applied to the attachment when it is changed from a left to a right hand plow, and vice versa.

It will be obvious from the foregoing that the seat 71 and its parts being constructed and arranged as described places the driver within convenient reach of the hand-levers 26 and 65 and enables him to easily and quickly operate the same for adjusting the two-wheeled truck 5 and the land-wheel 70 into desired positions; that said two-wheeled truck, the two-part standard 28 of the furrow-wheel 30, and their supporting and adjusting devices are of novel construction, capable of removal from and application to plow-beams of varying sizes and of transfer to the beams of either right or left hand plows; that the attachment for converting the plow from a riding to a walking plow can be removed from the plow-beam by the removal of the nut 13 from the rear clip 12, which releases the oblique brace-bar 52, and by the detachment of the sockets 57 on the inner ends of the branched land-wheel axle 53 from the inner branches of the nutted clips 37; that said attachment can be again applied to the same side of the plow-beam by a reversal of these operations, thus converting the walking-plow back into a riding-plow, or it can be transferred for the same purpose to the opposite side of the plow-beam for use in connection with a right or left hand plow, and that the upper end of the scraper 47 is adjustably and removably clamped between the serrated portions of the upper and lower arms 27 and 29 of the furrow-wheel standard 28, so as to avoid too great friction with the furrow-wheel 30 and permit of removal for repair or renewal.

Having thus fully described the construction and arrangement or combination of my invention, its advantages and operation, what I claim as new is—

1. In a plow, the combination, with a plow-beam, a two-wheeled truck, and a curved ratchet-bar pivoted centrally to said truck, of a bracket secured to the forward portion of said beam and formed with a curved slot for guiding said ratchet-bar, a hand-lever pivoted to one side of said beam and also to said truck and the lower end of said ratchet-bar for vertically moving said truck and bar, and a spring-pressed pawl for holding said ratchet-bar in different positions, substantially as described.

2. In a plow, the combination, with a plow-beam, a two-wheeled truck, and a curved ratchet-bar pivoted centrally and removably to said truck, of a removable bracket secured to the forward portion of said beam and formed with a curved slot for guiding said ratchet-bar, a hand-lever removably pivoted to one side of said beam and to said truck and ratchet-bar, and a finger-lever, connecting-rod, and spring-pressed pawl also removably pivoted to the side of said beam, substantially as described.

3. In a plow, the combination, with the plow-beam 1, the truck 5, the curved ratchet-bar 8, the bracket 11, formed with the curved slot 10, with the horizontal opening 15, and with the arm 17, having the open flange 16, and the clips 12, having the nuts 13, of the hand-lever 26, the finger-lever 25, the rod 24, the screw-bolt 21, the nut 22, the disk 20, having the lugs 19 and 23, the pawl 14, and the spiral spring 18, substantially as described.

4. In a plow, the combination, with a plow-beam and a two-part furrow-wheel standard consisting of a partly-serrated upper and lower arm, of means for securing and adjusting said upper arm transversely to and beneath said beam, and devices for vertically adjusting and holding said lower arm against the side of said upper arm, substantially as described.

5. In a plow, the combination, with the plow-beam 1, the lower and upper fish-plates 31 and 33, and the nutted clips 37 for securing said fish-plates to said beam, of the two-part furrow-wheel standard 28, consisting of the partly-serrated upper and lower arms 27 and 29, the latter being vertically adjustable upon the former, and the double or V-shaped bracket 49, secured to said upper fish-plate and standard for firmly bracing the latter, substantially as described.

6. In a plow, the combination, with a plow-beam and a two-part furrow-wheel standard attached thereto, consisting of an upper and a lower arm having transverse serrations formed upon both sides of each, of devices for vertically adjusting and holding said lower arm against either side of said upper arm, substantially as described.

7. A riding attachment for plows, provided with an obliquely and forwardly extending brace-bar, a horizontally and transversely extending branched axle, a driver's seat mounted near the outer end thereof, a vertically-adjustable land-wheel, and means for securing said attachment to either side of a plow-beam, substantially as described.

8. A riding attachment for plows, provided with an obliquely and forwardly extending brace-bar, a horizontally and transversely extending branched axle provided with sockets at its branched end, a driver's seat, a vertically-adjustable land-wheel, and nutted clips for securing said attachment to either side of a plow-beam, substantially as described.

9. In a riding attachment for plows, the combination, with the horizontally and transversely extending axle 53, having the recesses 61 formed in the sides of its outer end, of the segment-rack 58, provided with the base-bar 59, having the lugs 60 fitting in said recesses, the oblique brace-bar 52, having the flange 55 on its inner or rear end, and a single nutted screw-bolt 56 passing through and holding said parts and features in place upon said axle, substantially as described.

10. In a plow, the combination, with the plow-beam, of the furrow-wheel standard composed of an upper and lower arm formed with transverse serrations, a furrow-wheel journaled at the lower end of said standard, a scraper having its upper end arranged between said arms, and means for clamping said scraper in fixed position, substantially as described.

11. In a plow, the combination, with the plow-beam, of the furrow-wheel standard composed of an upper and lower arm formed with transverse serrations, a furrow-wheel journaled at the lower end of said standard, a scraper having its upper end arranged between said arms, and means for clamping said scraper and arms in different positions, said means consisting of a vertical slot formed in said lower arm and a screw-bolt and nut attached to said upper arm, substantially as described.

In testimony whereof I affix my signature in presence of two witnesses.

ASA M. FITCH.

Witnesses:
JOHN W. CONNER,
J. C. LANHAM.